(12) United States Patent  (10) Patent No.: US 12,427,933 B2
Pospical  (45) Date of Patent: Sep. 30, 2025

(54) STORAGE APPARATUS FOR COMPONENTS OF A WEIGHT DISTRIBUTION HITCH

(71) Applicant: Alex Pospical, Idaho Falls, ID (US)

(72) Inventor: Alex Pospical, Idaho Falls, ID (US)

(*) Notice: Subject to any disclaimer, the term of this patent is extended or adjusted under 35 U.S.C. 154(b) by 264 days.

(21) Appl. No.: 18/225,812

(22) Filed: Jul. 25, 2023

(65) Prior Publication Data
US 2024/0034248 A1 Feb. 1, 2024

Related U.S. Application Data

(60) Provisional application No. 63/392,419, filed on Jul. 26, 2022.

(51) Int. Cl.
| | |
|---|---|
| *B60R 11/06* | (2006.01) |
| *B65D 25/04* | (2006.01) |
| *B65D 25/16* | (2006.01) |
| *B65D 45/24* | (2006.01) |

(52) U.S. Cl.
CPC .............. *B60R 11/06* (2013.01); *B65D 25/04* (2013.01); *B65D 25/16* (2013.01); *B65D 45/24* (2013.01)

(58) Field of Classification Search
CPC .. B65D 25/04; B65D 1/24; B65D 2585/6882; B65D 85/68; B65D 5/48; B65D 5/48024; B60R 11/06
See application file for complete search history.

(56) References Cited

U.S. PATENT DOCUMENTS

| | | | | |
|---|---|---|---|---|
| 2,138,112 | A * | 11/1938 | Means | B65D 5/48024 229/120.05 |
| 2,142,276 | A * | 1/1939 | Lawrence, Jr. | B65D 25/04 206/438 |
| 2,875,942 | A * | 3/1959 | Wilson | B65D 5/48024 229/179 |
| 2,903,127 | A * | 9/1959 | Dorman | B65D 25/04 220/523 |
| 3,458,078 | A * | 7/1969 | Skidmore | B65D 25/04 312/73 |
| 5,682,998 | A * | 11/1997 | McCoy | B65D 5/5073 206/592 |
| 2003/0052131 | A1* | 3/2003 | Jensen | B65D 25/04 220/528 |
| 2003/0234195 | A1* | 12/2003 | Earl | B65D 43/14 206/338 |
| 2015/0060463 | A1* | 3/2015 | Ragha | B65D 43/161 220/554 |
| 2015/0158632 | A1* | 6/2015 | Wilhelm | B65D 47/263 426/120 |

(Continued)

FOREIGN PATENT DOCUMENTS

EP 3556678 A1 * 10/2019 ............. B65D 85/68

*Primary Examiner* — Don M Anderson

(57) ABSTRACT

A storage apparatus for components of a weight distribution hitch includes a housing. The housing includes a first sidewall, a second sidewall, a third sidewall, and a fourth sidewall. The housing may have an interior surface and an exterior surface. The housing may have one or more first top slots and one or more first bottom slots at a first end. The housing may also have one or more second top slots and one or more second bottom slots at a second end. The slots may receive divider plates that, once inserted, create compartments. End caps may be placed at the first end and the second end to seal the housing and protect the components of the weight distribution hitch.

20 Claims, 13 Drawing Sheets

(56) References Cited

U.S. PATENT DOCUMENTS

2017/0101211 A1* 4/2017 Lee .......................... B65D 5/14
2017/0361985 A1* 12/2017 Kaminkow ............ B65D 43/02
2018/0339809 A1* 11/2018 Dinihanian, Jr. ...... B65D 25/22
2025/0153919 A1* 5/2025 Cho ....................... B65D 85/68

* cited by examiner

STORAGE APPARATUS FOR COMPONENTS OF A WEIGHT DISTRIBUTION HITCH

CROSS-REFERENCE TO RELATED APPLICATIONS

This application claims the benefit of U.S. Provisional Application Ser. No. 63/392,419, filed on Jul. 26, 2022, which is incorporated herein by reference.

TECHNICAL FIELD

The present disclosure relates to a weight distribution hitch storage. More particularly, the present disclosure relates to a housing to store various components of a weight distribution hitch.

BACKGROUND

Many individuals are often found towing various loads behind their vehicles. These loads may include travel trailers, utility trailers, tilt trailers, and other types of trailers. To couple these trailers to a vehicle, a user would typically couple the trailer to a ball on a hitch, which is attached to the vehicle. Often, individuals place trailers on the hitch of a vehicle without any weight distribution systems. This can lead to increased weight placed on the back axle of the vehicle and can increase the likelihood of the trailer swaying and becoming unmanageable while driving.

Companies have created weight distribution hitches to remove the shortcomings of traditional hitches. When weight distribution hitches are used, the weight of the trailer is evenly distributed, thereby placing more weight on the front axle and the trailer. Weight distribution hitches include various components and storing these components when not in use can be a burden. For example, when making extremely tight turns, spring bars, whether for trunnion bar systems or round bar systems, typically will need to be removed. Once removed, storing the spring bars can be troublesome due to the fact that there is not a designated location to easily store them. As such, many are left to place the spring bars in or on the trailer, in the vehicle, or other locations. When there is not a designated location to place the spring bars, and other components when removed, the parts may be easily misplaced, leading to additional costs for replacements if the originals are not found. They may also cause damage to the trailer or vehicle if left loose so as to move around.

Accordingly, there is a need for a housing that receives various components of a weight distribution hitch and that is easy to use and access. The present invention seeks to solve these and other problems.

SUMMARY OF EXAMPLE EMBODIMENTS

In one embodiment, a storage apparatus for components of a weight distribution hitch comprises a housing. The housing includes a first side wall, a second side wall, a third side wall, and a fourth sidewall. The housing may have an interior surface and an exterior surface. The housing may comprise one or more first top slots and one or more first bottom slots at a first end. The housing may also comprise one or more second top slots and one or more second bottom slots at a second end.

The first end may comprise a first aperture, and the second end may comprise a second aperture. Two compartments may pass through the interior of the housing from the first aperture to the second aperture. It will be appreciated that the housing may be removably attachable to the frame of the trailer, either above or below the frame, or it may be attached at any other location on the trailer. Furthermore, in some embodiments, the housing may be secured in the bed of a vehicle. In other embodiments, the housing may be loose, being able to be placed wherever the user desires.

The compartments may be created after a first divider plate and a second divider plate is positioned within the housing. The compartments may be configured, for example, to receive spring bars so as to be stored therein when not in use. The first divider plate may comprise a first side, a second side, a first top side, a first bottom side, a first front, and a first rear. The first top side may comprise a first protrusion and a second protrusion. The first bottom side may comprise a third protrusion and a fourth protrusion. It will be understood that the first, second, third, and fourth protrusions may interact with the first top slots and the first bottom slots to secure the first divider plate to the interior surface of the housing. The second divider plate may comprise a third side, a fourth side, a second top side, a second bottom side, a second front, and a second rear. The second top side may comprise a fifth protrusion and a sixth protrusion. The second bottom side may comprise a seventh protrusion and an eighth protrusion. It will be understood that the fifth, sixth, seventh, and eighth protrusions may interact with the second top slots and second bottom slots to secure the second divider plate to the interior surface of the housing. Both the first end and the second end may receive a first end cap and second end cap, respectively.

DETAILED DESCRIPTION OF EXAMPLE EMBODIMENTS

Figure 1:
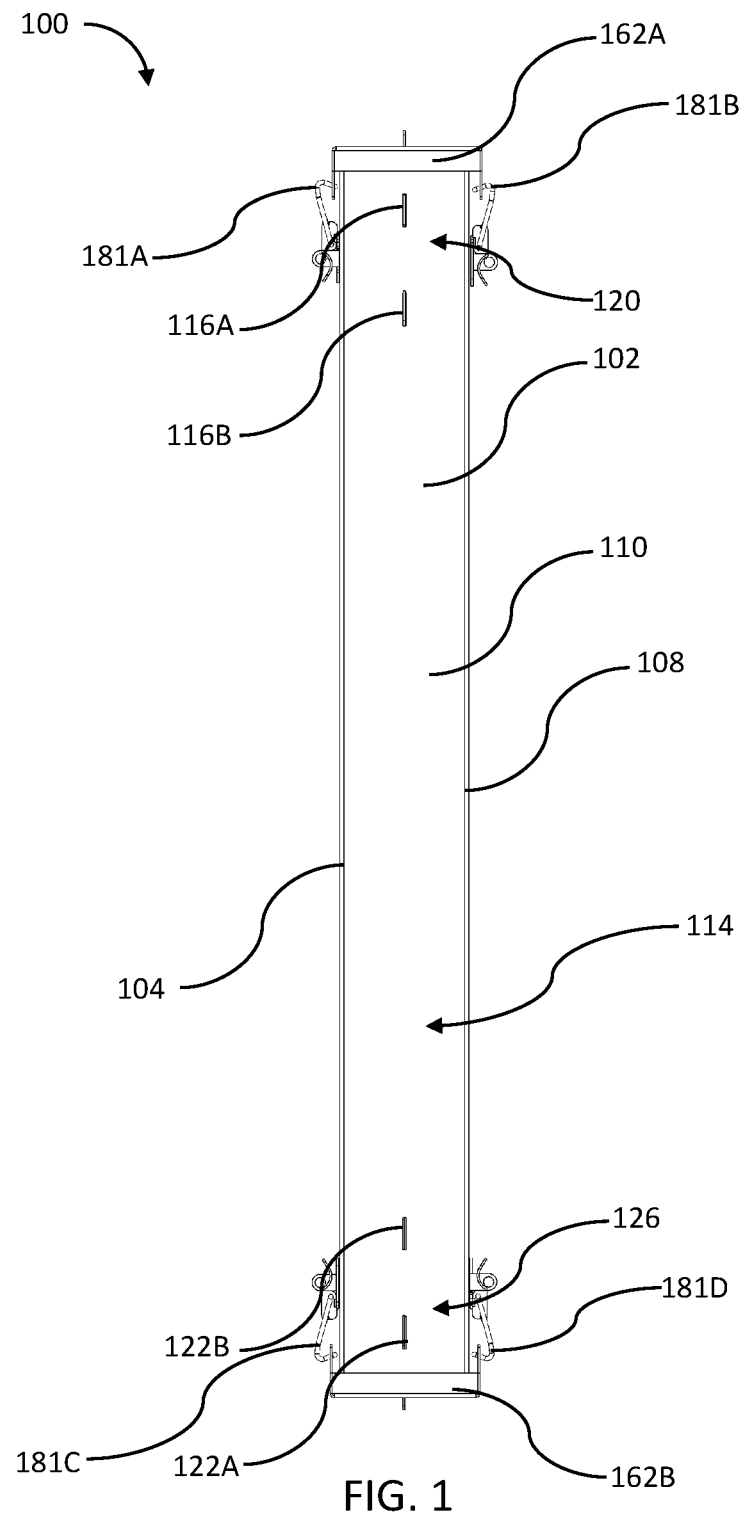
FIG. 1 illustrates a top plan view of a storage apparatus for components of a weight distribution hitch.
Figure 2:
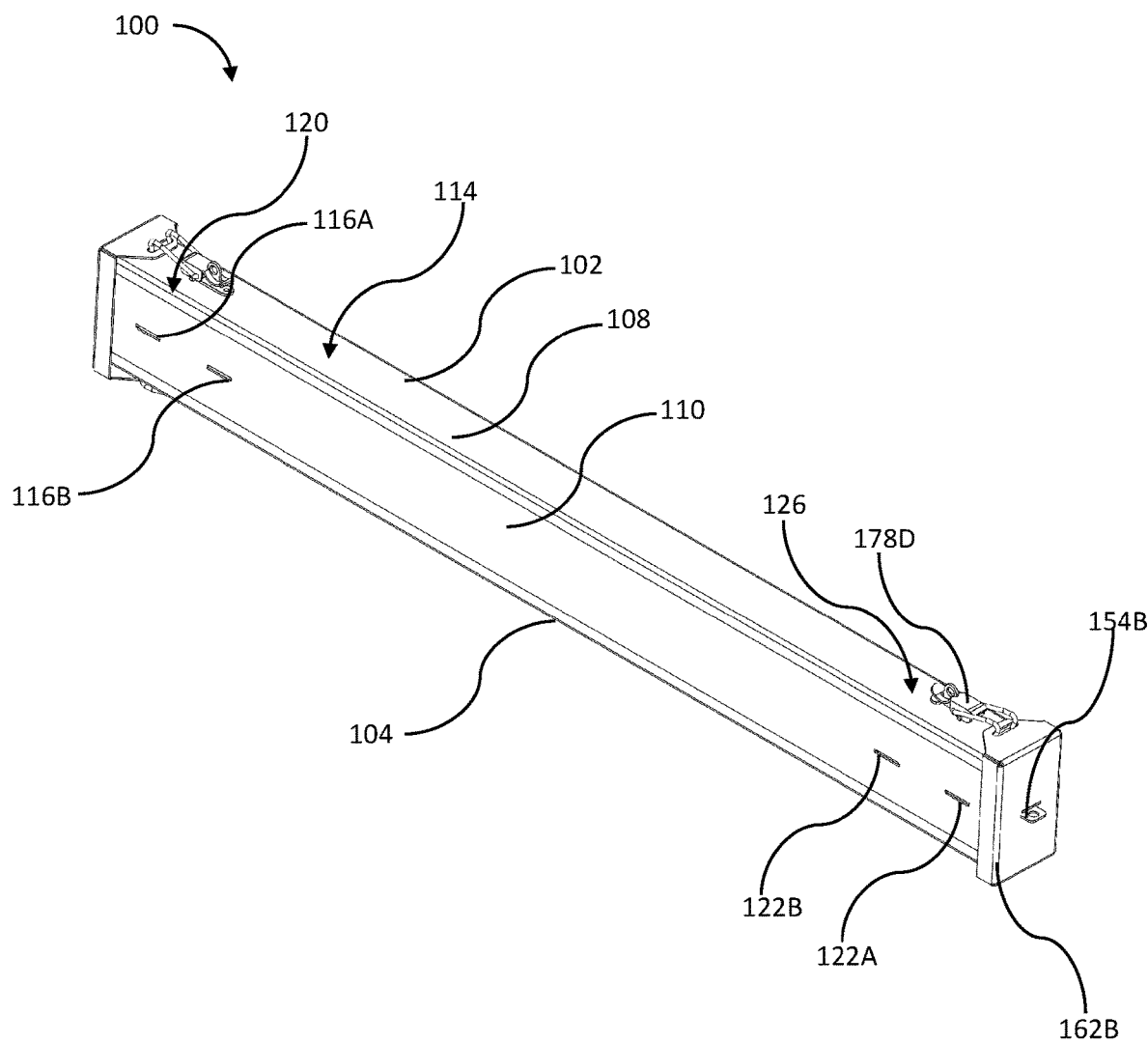
FIG. 2 illustrates a top, side perspective view of a storage apparatus for components of a weight distribution hitch.
Figure 3:
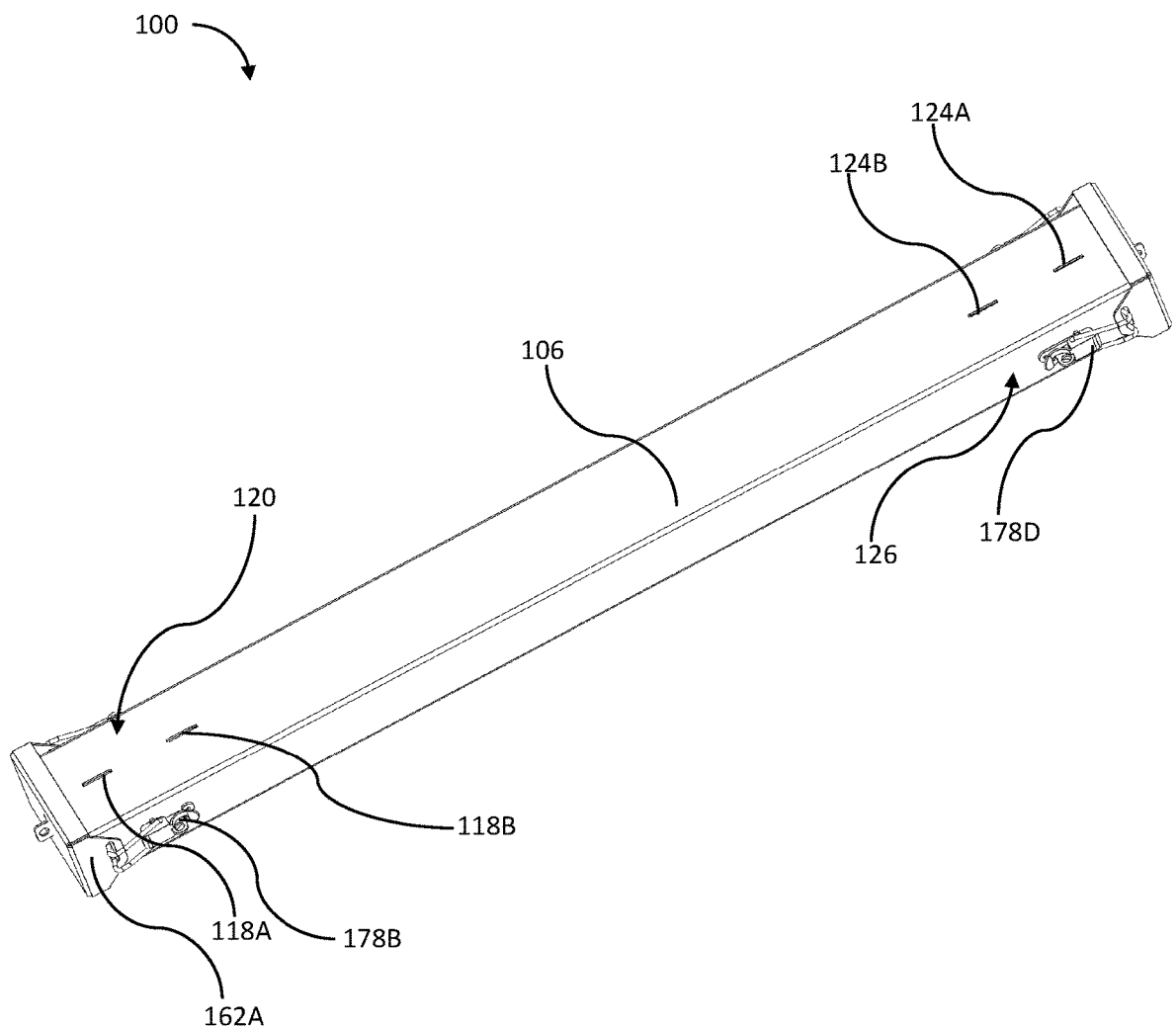
FIG. 3 illustrates a bottom, side perspective view of a storage apparatus for components of a weight distribution hitch.
Figure 4:
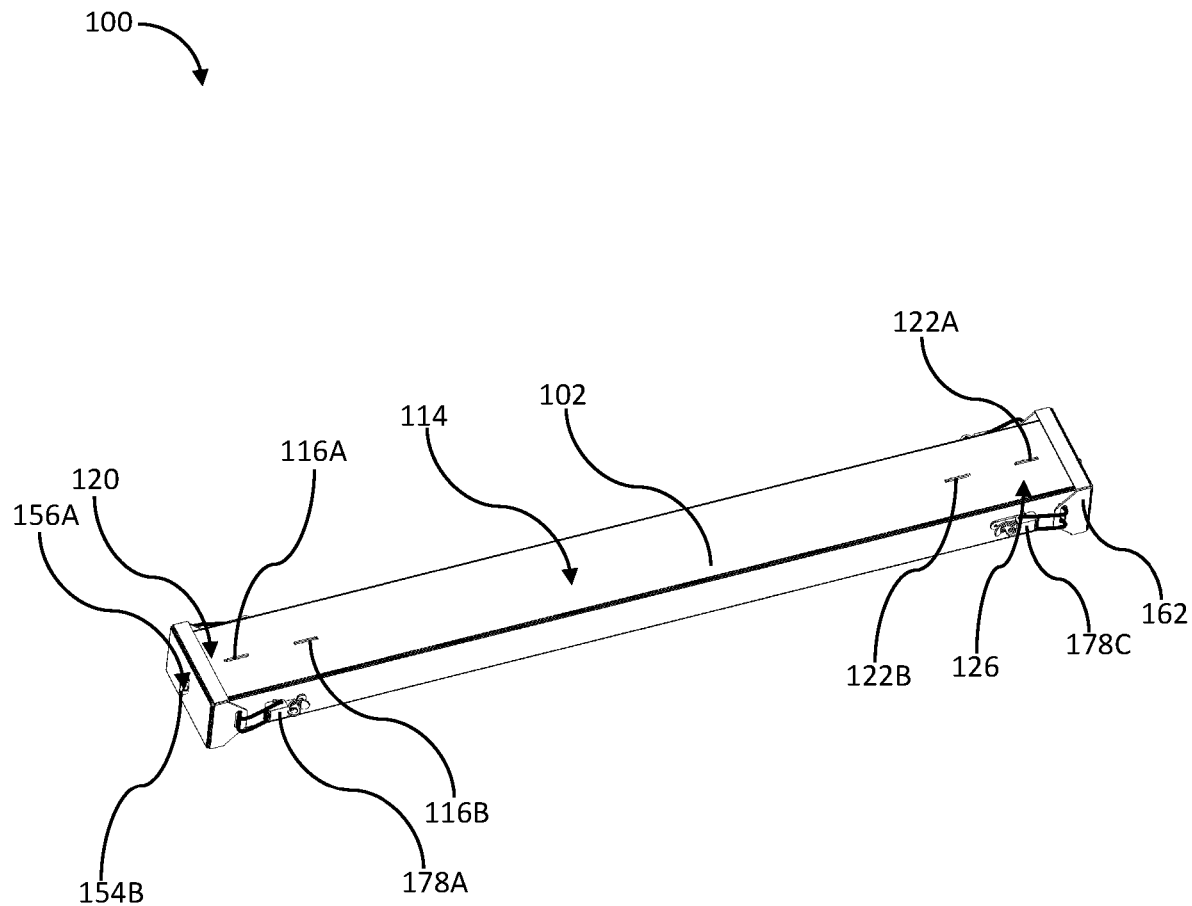
FIG. 4 illustrates a top, side perspective view of a storage apparatus for components of a weight distribution hitch.
Figure 5:
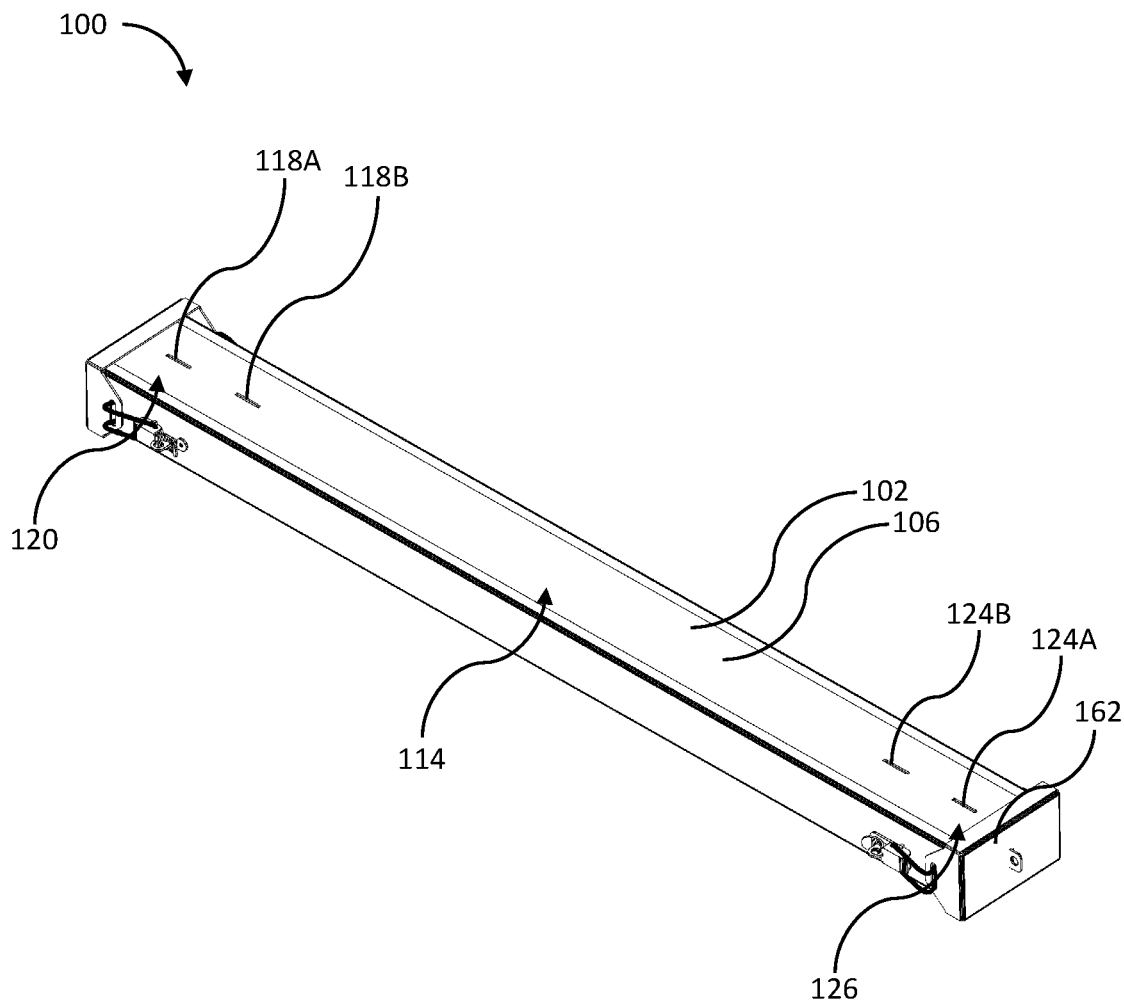
FIG. 5 illustrates a bottom, side perspective view of a storage apparatus for components of a weight distribution hitch.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of any of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a housing that receives various components of a weight distribution hitch and that is easy to use and access. The present invention seeks to solve these and other problems.

Trailers are an important part of society. They play a role in carrying a variety of loads, (e.g., UTVs and debris), and providing leisure when using a travel trailer. These trailers are typically coupled to a hitch on the back of a vehicle. If the trailers are too heavy, weight may be unevenly distributed across the vehicle, such as too much weight on the rear axle of the vehicle. This can lead to dangerous driving conditions and a lack of complete control when steering and braking. When the trailer has a significant amount of weight, many use weight distribution hitches that distribute the weight of the trailer across the vehicle, meaning that weight is not only transferred to the rear axle but to the front axle.

When a user is finished using the trailer, components of the weight distribution hitch are removed therefrom. These components may be stored in any number of locations, which increases the likelihood of them being misplaced. Some may place these components in the back of a vehicle, in or on the trailer, etc. If placed in the vehicle or on the trailer, the parts may move, thereby becoming damaged or causing damage to the vehicle or trailer.

The storage apparatus described herein comprises a housing. The housing includes sidewalls that are connected and establish an interior surface. A first and second divider plate is placed in the middle of the cavity to create a first compartment and a second compartment. These compartments may be configured to receive components of a weight distribution hitch, such as spring bars. It will be appreciated that other types of components may also be placed in the housing. The housing may be coupled to the tongue of a trailer. Furthermore, the housing may receive a first and a second end cap to seal the housing. The first and second end caps may be removably attachable thereto via, for example, latches. Accordingly, when the first and second end caps are latched to the housing, the storage apparatus may be impervious to liquid. As such, the components stored in the housing may be protected from rain, snow, and mud. It will be appreciated that the storage apparatus allows a user to protect and organize components of a weight distribution hitch.

As shown in FIGS. 1-5, in one embodiment, a storage apparatus 100 may comprise a housing 102 for components of a weight distribution hitch. The housing 102 may comprise a first sidewall 104, a second sidewall 106, a third sidewall 108, and a fourth sidewall 110. The first, second, third, and fourth sidewalls 104, 106, 108, 110 may be coupled together so as to create a cavity 111 therein. The housing 102 may have an interior surface 112 (FIG. 10) and an exterior surface 114. In some embodiments, the interior surface 112 of the housing may comprise silicone, a polymer, cloth, or any other type of anti-friction material or liner that reduces noise when loading components of a weight distribution hitch and prevent damage thereto. The anti-friction material may be removably attachable or permanent. The exterior surface 114 may be coated in an anti-rust material, silicone, or any other resilient material. The housing 102 may comprise one or more first top slots 116A, 116B (e.g., two slots) and one or more first bottom slots 118A, 118B (e.g., two slots) at a first end 120. The housing 102 may also comprise one or more second top slots 122A, 122B (e.g., two slots) and one or more second bottom slots 124A, 124B (e.g., two slots) at a second end 126. Other embodiments may have more or less than eight total slots on the housing 102. In some embodiments, the housing 102 may comprise continuous sides without having slots.

In some embodiments, the fourth sidewall 110 of the housing 102 may be a top panel that is placed on the first and third sidewalls 104, 108 via fasteners, which may include welding, nuts and bolts, or any other fastening mechanism. The second sidewall 106 may be a bottom panel that is placed on the first and third sidewalls 104, 108 via fasteners, which may include welding, nuts and bolts, or any other fastening mechanism. The first, second, third, and fourth sidewalls 104, 106, 108, 110 may, in some embodiments, be a single unit once fastened together. In some embodiments, the first, second, third, and fourth sidewalls 104, 106, 108, 110 may be manufactured from a single piece of material and bent into shape. The fourth sidewall 110 may comprise the one or more first top slots 116A, 116B and the one or more second top slots 122A, 122B. The second sidewall 106 may comprise the one or more first bottom slots 118A, 118B and the one or more second bottom slots 124A, 124B. While the slots are shown on the second and fourth sidewalls, it will be understood that the slots may also be on the first and third sidewalls. The housing 102 may be rectangular. In some embodiments, the housing 102 may be square-shaped, or any other shape or configuration. Other shapes may also be used, for example, the housing 102 may be cylindrical shaped. In some embodiments, the housing 102 may be manufactured from 16 gauge cold rolled steel or other types of steel. In some embodiments, the housing 102 may be manufactured from aluminum, plastic, fiberglass, carbon fiber, or any other type of material known in the art. The housing 102 may be different lengths, heights, widths, and/or shapes to receive any type of component of a weight distribution hitch.

Figure 10:
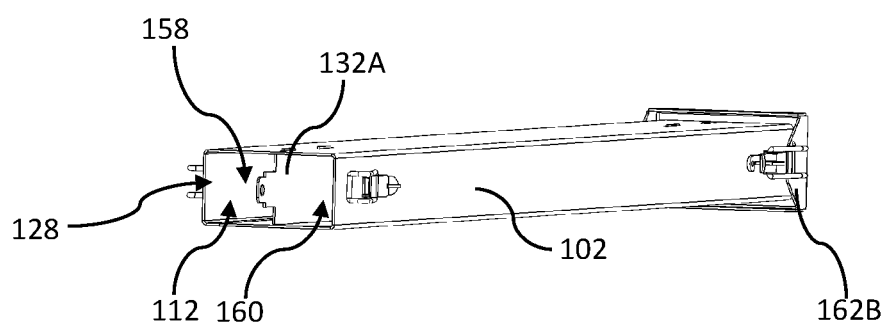
FIG. 10 illustrates a front, side perspective view of a storage apparatus for components of a weight distribution hitch.
Figure 11:
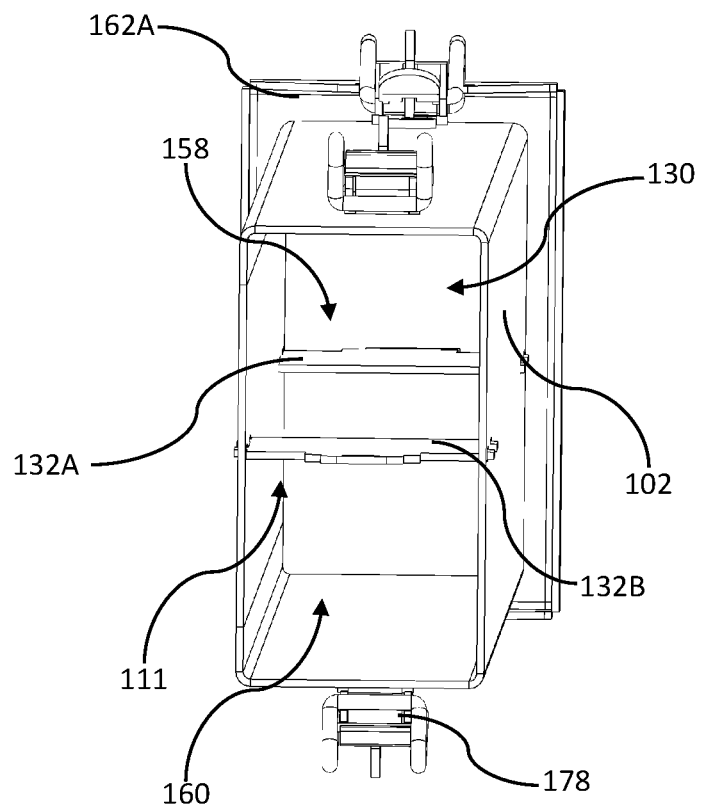
FIG. 11 illustrates a front perspective view of a storage apparatus for components of a weight distribution hitch.

Further, the first end 120 may comprise a first aperture 128, and the second end 126 may comprise a second aperture 130 (FIGS. 10-11). A user may access the cavity 111 (FIG. 11) via the first or second aperture 128, 130, thereby allowing a user to insert or remove components from either end of the housing 102. In some embodiments, the housing 102 may comprise a single sealed end so that the housing 102 is configured to receive a single end cap.

Figure 6:
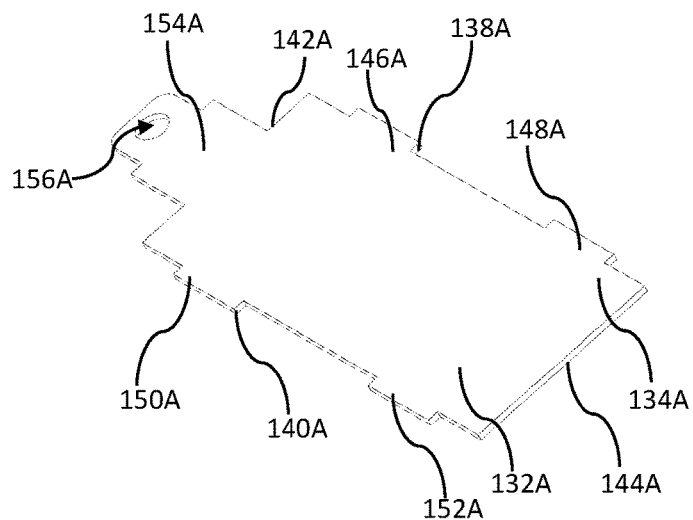
FIG. 6 illustrates a left-side perspective view of a first divider plate of a storage apparatus for components of a weight distribution hitch.
Figure 7:
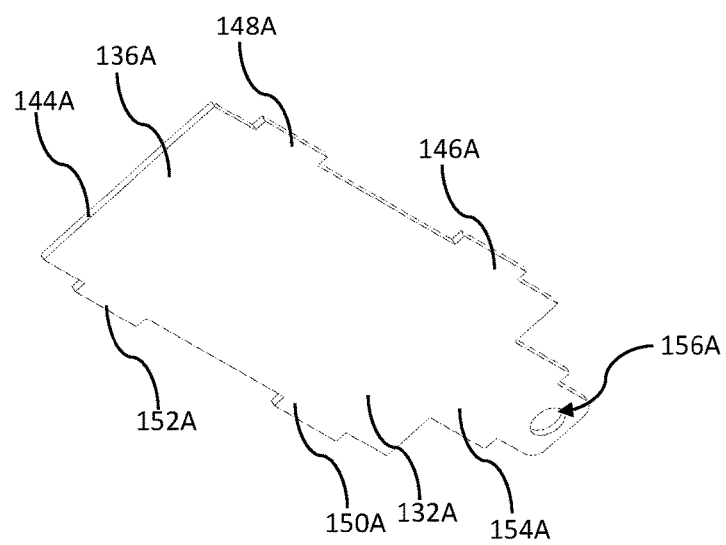
FIG. 7 illustrates a right-side perspective view of a first divider plate of a storage apparatus for components of a weight distribution hitch.

As shown in FIGS. 6-7, a first divider plate 132A and a second divider plate 132B (FIG. 8) may interact with the slots 116A, 116B, 118A, 118B, 122A, 122B, 124A, 124B found on the housing 102. More particularly, the first divider plate 132A may interact with (be inserted into) the one or more first top slots 116A, 116B and the one or more first bottom slots 118A, 118B; and the second divider plate 132B may interact with the one or more second top slots 122A, 122B and the one or more second bottom slots 124A, 124B. The first divider plate 132A may comprise a first side 134A, a second side 136A, a first top side 138A, a first bottom side 140A, a first front 142A, and a first rear 144A. The first top side 138A may comprise a first protrusion 146A and a second protrusion 148A. The first bottom side 140A may comprise a third protrusion 150A and a fourth protrusion 152A. It will be understood that the first, second, third, and fourth protrusions 146A, 148A, 150A, 152A may interact with and be positioned in the first top slots 116A, 116B and the first bottom slots 118A, 118B to secure the first divider plate 132A to the interior surface 112 of the housing 102. Further, the first front 142A may comprise a first front protrusion 154A that comprises a first protrusion aperture 156A that passes from the first side 134A to the second side 136A.

Figure 8:
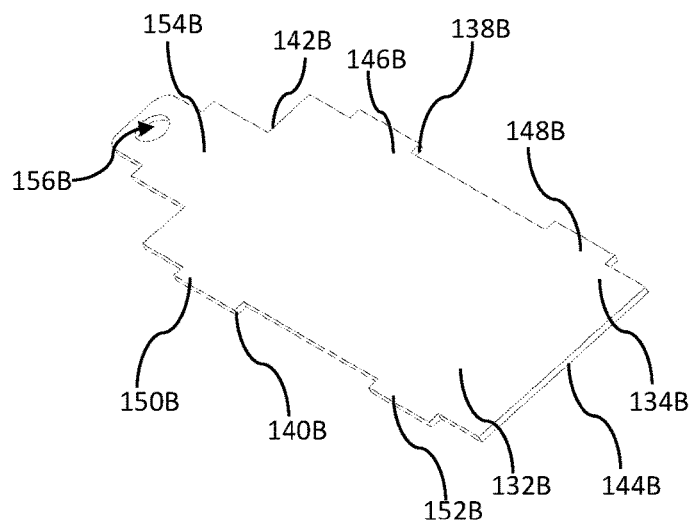
FIG. 8 illustrates a left-side perspective view of a second divider plate of a storage apparatus for components of a weight distribution hitch.
Figure 9:
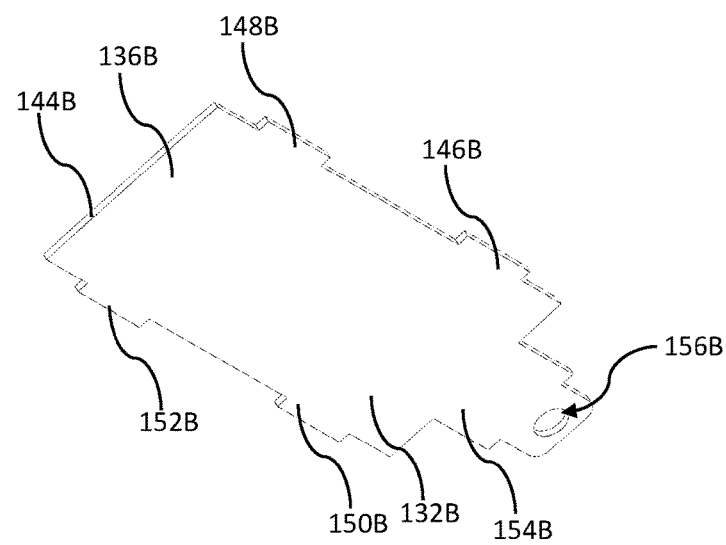
FIG. 9 illustrates a right-side perspective view of a second divider plate of a storage apparatus for components of a weight distribution hitch.

As shown in FIGS. 8-9, the second divider plate 132B may comprise a third side 134B, a fourth side 136B, a second top side 138B, a second bottom side 140B, a second front 142B, and a second rear 144B. The second top side 138B may comprise a fifth protrusion 146B and a sixth protrusion 148B. The second bottom side 140B may comprise a seventh protrusion 150B and an eighth protrusion 152B. It will be understood that the fifth, sixth, seventh, and eighth protrusions 146B, 148B, 150B, 152B may interact with and be positioned in the one or more second top slots 122A, 122B and the second bottom slots 124A, 124B to secure the second divider plate 132B to the interior surface 112 of the housing 102. Further, the second front 142B may comprise a second front protrusion 154B that comprises a second protrusion aperture 156B that passes from the third side 134B to the fourth side 136B.

As shown in FIGS. 10-11, once the first and second divider plates 132A, 132B are positioned in the housing 102, a first compartment 158 and a second compartment 160 may be formed and pass through the interior of the housing 102 from the first aperture 128 to the second aperture 130. In some embodiments, the housing 102 may have one or more compartments that pass from the first aperture 128 to the second aperture 130. The compartments 158, 160 may be configured to receive spring bars, or other components, so as to be stored therein when not in use. The first and second divider plates 132A, 132B may be manufactured from steel, aluminum, or any other type of material. In some embodiments, the first and second divider plates 132A, 132B may be removably attachable to the housing 102 so as to create one or more compartments. Furthermore, it will be appreciated that the first and second divider plates 132A, 132B may be different lengths, such as a first size that does not run the length of the housing 102 and a second size that runs the length of the housing 102.

Figure 12:
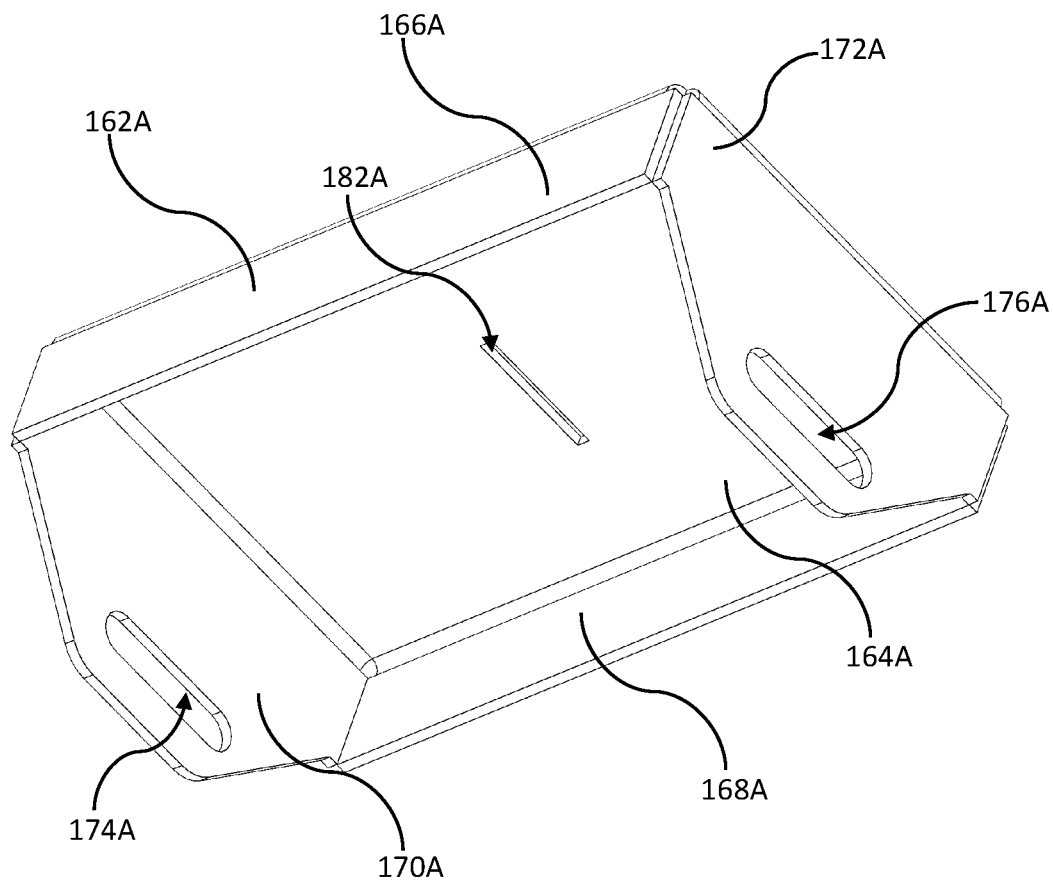
FIG. 12 illustrates a bottom perspective view of a first end cap of a storage apparatus for components of a weight distribution hitch.
Figure 13:
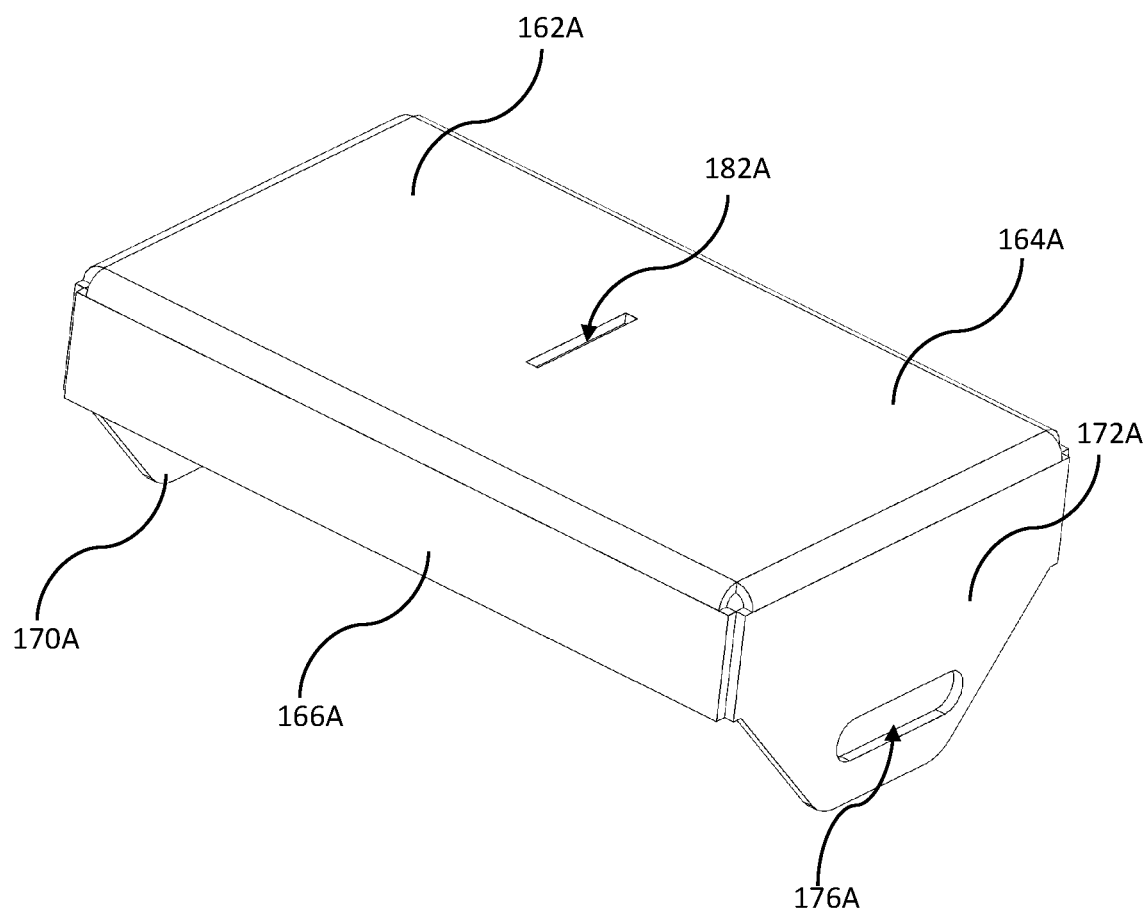
FIG. 13 illustrates a top perspective view of a first end cap of a storage apparatus for components of a weight distribution hitch.

As shown in FIGS. 12-15, both the first end 120 and the second end 126 may receive a first end cap 162A and a second end cap 162B, respectively. Referring to FIGS. 12-13, the first end cap 162A may comprise a first front panel 164A, a first end cap sidewall 166A, a second end cap sidewall 168A spaced apart from and parallel with the first end cap sidewall 166A, a third end cap sidewall 170A, and a fourth end cap sidewall 172A spaced apart from and parallel with the third end cap sidewall 170A. The third end cap sidewall 170A comprises a first end cap slot 174A and the fourth end cap sidewall 172A comprises a second end cap slot 176A. The first and second end cap slots 174A, 176A may each receive latches 178A, 178B (shown in FIGS. 3-4). For example, when the first end cap 162A is positioned on the first end 120, arms 181A, 181B (FIG. 1) of the latches 178A, 178B may be inserted into the first and second end cap slots 174A, 176A. In addition, the first front panel 164A may comprise a first front panel slot 182A that may receive the first front protrusion 154A of the first divider plate 132A when the end cap 162A is placed on the first end 120. Once the first end cap 162A is placed on the first end 120, a user may place a lock, such as a padlock, through the first protrusion aperture 156A, thereby securing the first end cap 162A to the housing 102.

Figure 14:
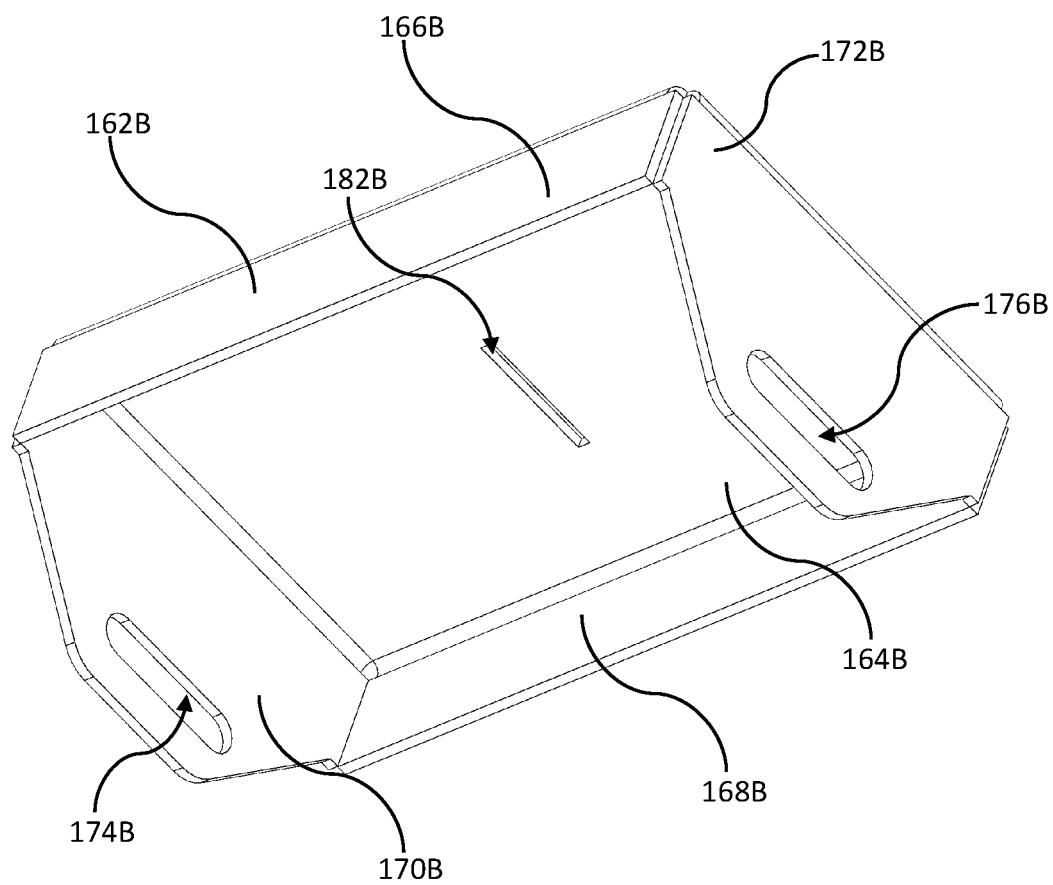
FIG. 14 illustrates a bottom perspective view of a second end cap of a storage apparatus for components of a weight distribution hitch.
Figure 15:
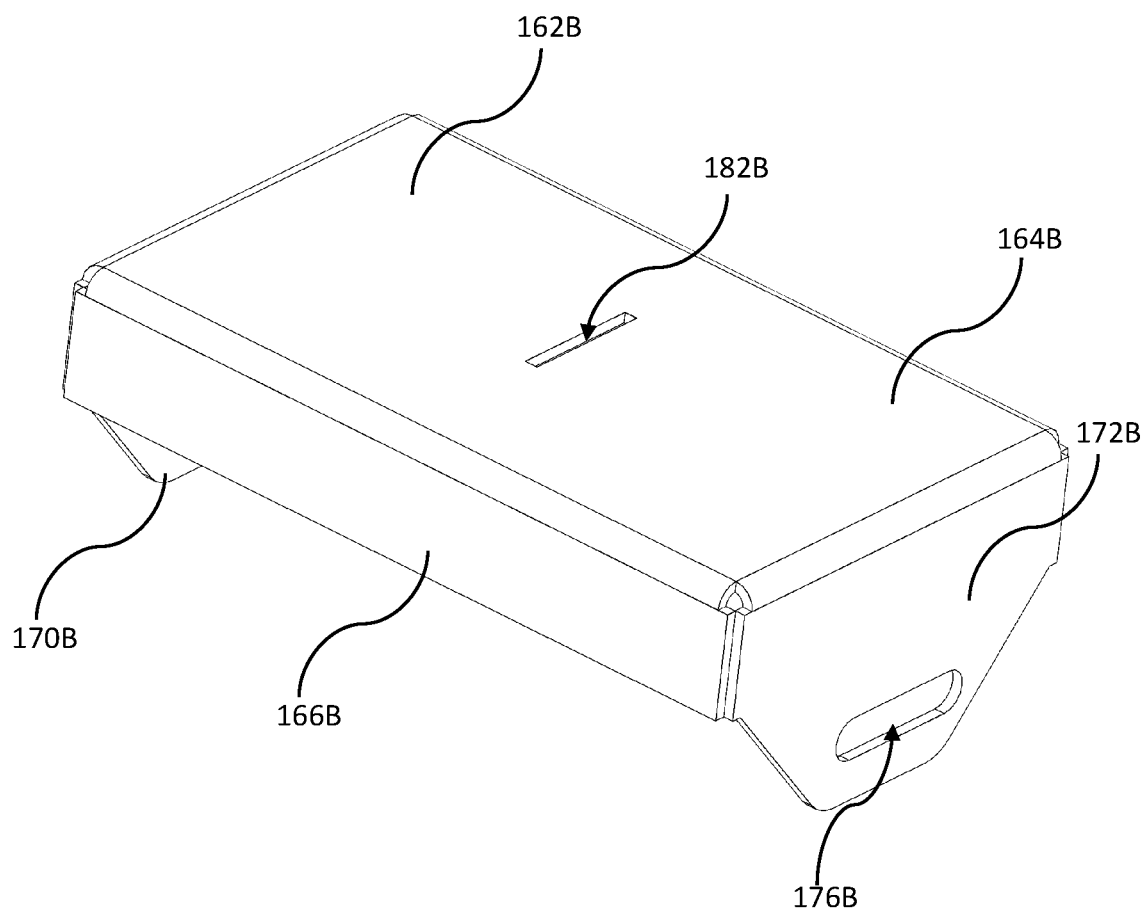
FIG. 15 illustrates a top perspective view of a second end cap of a storage apparatus for components of a weight distribution hitch.

Referring to FIGS. 14-15, similar to the first end cap 162A, the second end cap 162B may comprise a second front panel 164B, a fifth end cap sidewall 166B, a sixth end cap sidewall 168B spaced apart from and parallel with the fifth end cap sidewall 166B, a seventh end cap sidewall 170B, and an eighth end cap sidewall 172B spaced apart from and parallel with the seventh end cap sidewall 170B. The seventh end cap sidewall 170B comprises a third end cap slot 174B and the eighth end cap sidewall 172B comprises a fourth end cap slot 176B. The third and fourth end cap slots 174B, 176B may each receive the latches 178C, 178D (shown in FIGS. 3-4). For example, when the second end cap 162B is positioned on the second end 126, the arms 181C, 181D (FIG. 1) of the latches 178C, 178D may be inserted into the third and fourth end cap slots 174B, 176B. In addition, the second front panel 164B may comprise a second front panel slot 182B that may receive the second front protrusion 154B of the second divider plate 132B when the second end cap 162B is placed on the second end 126. Once the second end cap 162B is placed on the second end 126, a user may place a lock, such as a padlock, through the second protrusion aperture 156B, thereby securing the second end cap 162B to the housing 102. After the first and second end caps 162A, 162B are secured to the housing 102, the housing 102 may be impervious, thereby protecting the components in the cavity 111. An inner surface of both the first and second end caps 162A, 162B may each comprise a foam, rubber, or any other sealant material that will aid in the first and second caps 162A, 162B being impervious to water. Further, it will be appreciated that the first and second caps 162A, 162B may be interchangeable, meaning the first end cap 162A may be placed on the second end 126 and the second end cap 162B may be placed on the first end 120.

It will be appreciated that the housing 102 may be removably attachable to the frame or tongue of the trailer, either above or below, or it may be attached at any other location on the trailer. Furthermore, in some embodiments, the housing 102 may be secured in the bed of a vehicle. In other embodiments, the housing 102 may be loose, being able to be placed wherever the user desires.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A storage apparatus for components of a weight distribution hitch comprising:
   a housing comprising:
   a cavity;
   one or more first top slots and one or more first bottom slots at a first end;
   one or more second top slots and one or more second bottom slots at a second end;
   a first aperture; and
   a second aperture;
   a first divider plate comprising a first side, a second side, a first top side, a first bottom side, a first front, and a first rear;
   a second divider plate comprising a third side, a fourth side, a second top side, a second bottom side, a second front, and a second rear;
   wherein when the first divider plate and the second divider plate are inserted and secured in the cavity of the housing, a first compartment and a second compartment are formed;
   a first end cap and a second end cap; and
   one or more latches coupled to the housing that secure the first end cap and second end cap.

2. The storage apparatus for components of a weight distribution hitch of claim 1, wherein the housing comprises a liner on an interior surface.

3. The storage apparatus for components of a weight distribution hitch of claim 1, wherein the housing comprises a first sidewall, a second sidewall, a third sidewall, and a fourth sidewall.

4. The storage apparatus for components of a weight distribution hitch of claim 3, wherein the fourth sidewall comprises the one or more first top slots and the one or more second top slots, and the second sidewall comprises the one or more first bottom slots and the one or more second bottom slots.

5. The storage apparatus for components of a weight distribution hitch of claim 1, wherein the housing comprises cold rolled steel.

6. The storage apparatus for components of a weight distribution hitch of claim 1, wherein the first top side of the first divider plate comprises a first protrusion and a second protrusion, and the first bottom side comprises a third protrusion and a fourth protrusion.

7. The storage apparatus for components of a weight distribution hitch of claim 1, wherein the first front comprises a first front protrusion.

8. The storage apparatus for components of a weight distribution hitch of claim 6, wherein the first protrusion and the second protrusion are both positioned in the one or more first top slots, and the third protrusion and the fourth protrusion are both positioned in the one or more first bottom slots.

9. The storage apparatus for components of a weight distribution hitch of claim 7, wherein the first front protrusion comprises a first protrusion aperture that passes from the first side to the second side.

10. The storage apparatus for components of a weight distribution hitch of claim 1, wherein the second top side comprises a fifth protrusion and a sixth protrusion, and the second bottom side comprises a seventh protrusion and an eighth protrusion.

11. The storage apparatus for components of a weight distribution hitch of claim 1, wherein the second front comprises a second front protrusion.

12. The storage apparatus for components of a weight distribution hitch of claim 10, wherein the fifth protrusion and the sixth protrusion are both positioned in the one or more second top slots, and the seventh protrusion and the eighth protrusion are both positioned in the one or more second bottom slots.

13. The storage apparatus for components of a weight distribution hitch of claim 11, wherein the second front protrusion comprises a second protrusion aperture that passes from the third side to the fourth side.

14. A storage apparatus for components of a weight distribution hitch comprising:
   a housing removably attachable to a tongue of a trailer, the housing comprising:
   a first sidewall, a second sidewall, a third sidewall, and a fourth sidewall, the first, second, third, and fourth sidewalls couple together to form a cavity;
   one or more first top slots and one or more first bottom slots;
   one or more second top slots and one or more second bottom slots;
   a first end with a first aperture and a second end with a second aperture;
   a first divider plate positioned in the housing;
   a second divider plate positioned in the housing;

a first end cap comprising:
  a first front panel, a first end cap sidewall, a second end cap sidewall, a third end cap sidewall, and a fourth end cap sidewall;
  the third end cap sidewall comprises a first end cap slot;
  the fourth end cap sidewall comprises a second end cap slot;
a second end cap comprising:
  a second front panel, a fifth end cap sidewall, a sixth end cap sidewall, a seventh end cap sidewall, and an eighth end cap sidewall;
  the seventh end cap sidewall comprises a third end cap slot;
  the eighth end cap sidewall comprises a fourth end cap slot;
one or more latches coupled to the housing that secure the first end cap and second end cap.

15. The storage apparatus for components of a weight distribution hitch of claim 14, wherein the one or more latches comprises a first latch, a second latch, a third latch, and a fourth latch.

16. The storage apparatus for components of a weight distribution hitch of claim 15, wherein the first latch and the second latch are both coupled to the first end of the housing.

17. The storage apparatus for components of a weight distribution hitch of claim 15, wherein the third latch and the fourth latch are both coupled to the second end of the housing.

18. The storage apparatus for components of a weight distribution hitch of claim 15, wherein the first latch interacts with the first end cap slot, and the second latch interacts with the second end cap slot.

19. The storage apparatus for components of a weight distribution hitch of claim 15, wherein the third latch interacts with the third end cap slot, and the fourth latch interacts with the fourth end cap slot.

20. A storage apparatus for components of a weight distribution hitch comprising:
  a housing removably attachable to a tongue of a trailer, the housing comprising:
    a first sidewall, a second sidewall, a third sidewall, and a fourth sidewall, the first, second, third, and fourth sidewalls couple together to form a cavity;
    one or more first top slots and one or more first bottom slots;
    one or more second top slots and one or more second bottom slots;
    a first end with a first aperture and a second end with a second aperture;
  a first divider plate comprising:
    a first side, a second side, a first top side, a first bottom side, a first front, and a first rear; the first top side comprises a first protrusion and a second protrusion; the first bottom side comprises a third protrusion and a fourth protrusion; the first front comprises a first front protrusion;
  a second divider plate comprising:
    a third side, a fourth side, a second top side, a second bottom side, a second front, and a second rear; the second top side comprises a fifth protrusion and a sixth protrusion; the second bottom side comprises a seventh protrusion and an eighth protrusion; the second front comprises a second front protrusion;
  wherein when the first divider plate and the second divider plate are inserted and secured in the cavity of the housing, a first compartment and a second compartment are formed;
  a first end cap comprising:
    a first front panel, a first end cap sidewall, a second end cap sidewall, a third end cap sidewall, and a fourth end cap sidewall;
    the third end cap sidewall comprises a first end cap slot;
    the fourth end cap sidewall comprises a second end cap slot; the first front panel comprises a first front panel slot that receives the first divider plate;
  a second end cap comprising:
    a second front panel, a fifth end cap sidewall, a sixth end cap sidewall, a seventh end cap sidewall, and an eighth end cap sidewall;
    the seventh end cap sidewall comprises a third end cap slot;
    the eighth end cap sidewall comprises a fourth end cap slot;
    the second front panel comprises a second front panel slot that receives the second divider plate;
  one or more latches coupled to the housing that secure the first end cap and second end cap.

* * * * *